(12) United States Patent
Nomizu (10) Patent No.: US 6,301,391 B1
(45) Date of Patent: Oct. 9, 2001

(54) CODING APPARATUS

(75) Inventor: Yasuyuki Nomizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/166,783

(22) Filed: Oct. 6, 1998

(30) Foreign Application Priority Data

Oct. 15, 1997 (JP) .................................................. 9-297754

(51) Int. Cl.$^7$ ...................................................... G06K 9/36
(52) U.S. Cl. ............................................ 382/236; 348/416
(58) Field of Search .................................... 382/236, 242, 382/243, 238; 348/416, 407, 413, 402

(56) References Cited

U.S. PATENT DOCUMENTS

| | | | |
|---|---|---|---|
| 4,091,424 | 5/1978 | Widergren | 358/260 |
| 4,463,386 | 7/1984 | Goddard et al. | 358/261 |
| 5,331,431 | 7/1994 | Jasinski | 358/462 |
| 6,014,173 | * 1/2000 | Miyamoto | 382/416 |

FOREIGN PATENT DOCUMENTS

| | | |
|---|---|---|
| 0 042 981 | 1/1982 | (EP) . |
| 30 24 322 | 1/1982 | (DE) . |

* cited by examiner

*Primary Examiner*—Jerome Grant, II
*Assistant Examiner*—Neggisie Worku
(74) *Attorney, Agent, or Firm*—Oblon, Spivak, McClelland, Maier & Neustadt, P.C.

(57) ABSTRACT

An identical-image coding portion obtains a code for a currently processed block area of image information as a result of coding an index indicating an identical block area of image information, when a similar-image determining portion determines that a similar block area of image information is the identical block area of image information. A first predictive coding portion obtains a code for the currently processed block area of image information as a result of performing predictive coding of the currently processed block area of image information using a useful similar block area of image information, when the similar-image determining portion determines that the similar block area of image information is the useful similar block area of image information. A second predictive coding portion obtains a code for the currently processed block area of image information as a result of performing predictive coding of the currently processed block area of image information, when the similar-image determining portion determines that the similar block area of image information is a non-useful similar block area of image information.

9 Claims, 8 Drawing Sheets

CODING APPARATUS

BACKGROUND OF THE INVENTION

1. Field of the Invention

The present invention relates to a coding apparatus which codes data to be transmitted.

2. Description of the Related Art

Recently, almost all documents used in offices are produced by personal computers or word processors. There are relatively few documents produced through handwriting.

Most documents produced by personal computers or word processors include letters and ruled lines, but typically do not include photographs.

In images of these documents, a certain degree of regularity is present in sizes, shapes, intervals, arrangements and so forth of letters. In contract to this, in images of photographs or handwritten documents, such characteristics are not present.

In an apparatus which treats an image as electronic information such as a facsimile machine or a digital copier, an input image is optically scanned through a scanner or the like so that the input image is converted into electronic information.

An amount of electronic information obtained through this conversion depends on the resolution and the size of the image. This amount becomes larger as the resolution or the size of the image increases. Ordinarily, the electronic information obtained through such conversion is stored in a storage area temporarily. Therefore, as the amount of information increases, the necessary capacity of the storage area increases.

Especially, recently, there is a trend that the resolution increases. Thereby, the necessary capacity of a memory or a disk for storing electronic information of images increases, and the costs therefor increase.

In order to solve this problem, there is a method for efficiently coding an input image. Typical examples of image coding are MH, MR and MMR methods which are used in facsimile machines and so forth. In each of these methods, images are coded for each raster without regard to the types of the images. Therefore, these methods can be used for most types of images.

Such an image coding method will now be described in detail. Image coding methods can be classified into those for bi-level images and those for multilevel images. The MH, MR, MMR coding methods are those for bi-level images, and are standard coding methods for facsimile machines. Further, recently, a coding method using arithmetic code has been watched, and a coding method called QM-coder is used in a JBIG method which is studied as a standard method in ITU-T (International Telecommunication Union—Telecommunication Standardization Sector) and ISO (International Organization for Standardization).

On the other hand, as the coding methods for multilevel images, there is an ADCT (Adaptive Discrete Cosine Transform) method (called a JPEG method) using DCT (Discrete Cosine Transform) which is studied as a standard method in ITU-T and ISO. In this method, after image information is converted into frequency information, the information is coded.

Accordingly, in an image processing apparatus provided with a coding apparatus in the related art, by using such coding in the related art, an amount of information is compressed, and it is possible to reduce a memory capacity.

In the coding apparatus in the related art, it is possible to efficiently code letter images. However, for images of photographs, images of handwritten letters or the like, it is not possible to sufficiently efficiently code the images.

Further, in a case where letter images are coded, information such as characteristics of the letters are not used, and the letter images are simply treated as images. Therefore, it is not possible to code the images with a very high coding efficiency.

SUMMARY OF THE INVENTION

The present invention is directed to eliminating the above-mentioned problems, and an object of the present invention is to provide a coding apparatus which can perform coding at a high speed, accurately, with a very high coding efficiency.

In many cases, in a letter image produced by a personal computer or a word processor, there is regularity in shapes, sizes and so forth of letters. Therefore, by using such regularity, it is possible to perform coding of such a letter image with a high efficiency.

A coding apparatus, according to the present invention, comprises:

an image-area dividing portion dividing input image information into block areas of image information for respective letters and/or figures;

an area-image-information storing portion storing the block areas of image information provided by the image-area dividing portion;

a similar-image selecting portion comparing a currently processed block area of image information with the block areas of image information already coded and stored in the area-image-information storing portion, and selecting and extracting a block area of image information, from the block areas of image information stored in the area-image-information storing portion, which block area is similar to the currently processed block area of image information;

a similar-image determining portion determining the similar block area of image information selected and extracted by the similar-image selecting portion to be an identical block area of image information when determining that the similar block area of image information is identical to the currently processed block area of image information, determining the similar block area of image information to be a useful similar block area of image information when determining that the similar block area of image information is so similar to the currently processed block area of image information that the similar block area of image information is useful in coding the currently processed block area of image information, and determining the similar block area of image information to be a non-useful similar block area of image information when determining that the similar block area of image information is not sufficiently similar to the currently processed block area of image information such that the similar block area of image information is not useful in coding the currently processed block area of image information;

an identical-image coding portion obtaining a code for the currently processed block area of image information as a result of coding an index indicating the identical block area of image information, when the similar-image determining portion determines that the similar block area of image information is the identical block area of image information;

a first predictive coding portion obtaining a code for the currently processed block area of image information as a result of performing predictive coding using the useful similar block area of image information, when the similar-image determining portion determines that the similar block area of image information is the useful similar block area of image information;

a second predictive coding portion obtaining a code for the currently processed block area of image information as a result of performing predictive coding, when the similar-image determining portion determines that the similar block area of image information is the non-useful similar block area of image information; and a code-information producing portion producing code information based on the codes obtained by the identical-image coding portion, the first predictive coding portion and the second predictive coding portion.

Thereby, it is possible to perform the coding operation with a high efficiency.

The area-image-information storing portion may store information of a size and a position of the block area for each block area of image information, instead of storing the block area of image information itself.

When the block areas of image information themselves are stored, a large storage capacity is needed. As a result of storing the information of the size and the position of the block area for each block area of image information, it is possible to reduce a necessary storage capacity, and the block area of image information can be referred to as a result of the size and the position of the block area being specified. Further, as a result of additionally storing an index for each block area of image information together with the information of the size and the position of the block area, it is possible to refer to the block area of image information merely by referring to the index therefor.

The identical-image coding portion may code the index indicating the identical block area of image information and information of a position of the currently processed block area;

the first predictive coding portion may code the index indicating the useful similar block area of image information and the information of the position of the currently processed block area, and code the currently processed block area of image information as a result of performing predictive coding using the useful similar block area of image information; and the second predictive coding portion may code the information of the position of the currently processed block area, and code the currently processed block area of image information as a result of performing predictive coding.

Thereby, it is not necessary to code the block areas of image information in an order in which the block areas are arranged. Further, when decoding, it is possible to extract and decode arbitrary block areas of image information.

The information of the position of the currently processed block area of image information coded by each of the identical-image coding portion, the first predictive coding portion and the second predictive coding portion may be obtained as information of a difference between a position of a previously processed block area and the position of the currently processed block area.

In many cases, in a letter image produced by a personal computer or a word processor, an arrangement of and intervals between letters have regularity. When coding the information of the position of each block area of image information, as the absolute value of the amount of the information of the position decreases, the amount of the code thereof decreases and efficient coding can be performed. Therefore, as a result of using the information of the position of the block area adjacent to the currently processed block area, it is possible to reduce the absolute value of the amount of the information needed to specify the position of the currently processed block area. Thereby, highly efficient coding can be achieved.

The information of the difference between the position of the previously processed block area and the position of the currently processed block area may be the distance between ends of the previously processed block area and the currently processed block area, the ends of the previously processed block area and the currently processed block area being selected such that the distance between the ends of the previously processed block area and the currently processed block area is shortest.

Thus, when using the information of the position of the block area adjacent to the currently processed block area, by using the ends of the currently processed block area and the adjacent block area, the ends being selected such that the distance between the ends is shortest, it is possible to further reduce the absolute value of the amount of the information needed to specify the position of the currently processed block area. Thereby, further highly efficient coding can be achieved.

Each of the identical-image coding portion, the first predictive coding portion and the second predictive coding portion may add first identification information to the code of the currently processed block area of image information, the first identification information indicating which one of the identical-image coding portion, the first predictive coding portion and the second predictive coding portion has been used for coding the currently processed block area of image information; and the code-information producing portion adds second identification information to the end of the code information, the second identification information indicating the end of the code information.

Thereby, as a result of adding the first identification information to the code of each block area of image information, it is possible to easily and correctly determine a process of decoding for the code of each block area of image information in a decoding side. Thereby, it is possible to improve the decoding efficiency.

The similar-image selecting portion may select and extract the block area of image information, which block area has a size the same as the size of the currently processed block area.

There may be a problem that a long time is required for searching for the similar block area of image information when the number of the block areas of image information to be searched is large. However, as a result of the similar-image selecting portion searching for the block area of image information, which block are has the size the same as the size of the currently processed block area, an arrangement of the similar-image selecting portion can be simplified and a high-speed search can be achieved.

The similar-image determining portion may determine whether the similar block area of image information is the identical block area of image information, is the useful similar block area of image information or the non-useful similar block area of image information, by determining how many pixels are different between the pixels of the currently processed block area of image information and the pixels of the similar block area of image information.

Thereby, an arrangement of the similar-image determining portion can be simplified and a high-speed determination can be achieved.

A decoding apparatus, according to another aspect of the present invention, comprises:

an identifying portion determining whether an input code comprises a first type of code, a second type of code or a third type of code, the first type of code comprising a code obtained as a result of an index indicating a similar block area of image information determined to be identical to a currently processed block area of image information being coded, the second type of code comprising a code obtained as a result of an index indicating the similar block area of image information determined to be useful in coding the currently processed block area of image information being coded, and a code obtained as a result of the currently processed block area of image information being coded by using the similar block area of image information, and the third type of code comprising a code obtained as a result of the currently processed block area of image information being coded by using no other block area of image information;

an identical-image decoding portion, when the identifying portion determines that the input code comprises the first type of code, decoding the code so as to obtain the index, and obtaining the currently processed block area of image information as a result of obtaining the similar block area of image information, which has already been reproduced and stored in a reproduced-area storing portion, from the reproduced-area storing portion, using the thus-obtained index;

a first predictive decoding portion, when the identifying portion determines that the input code comprises the second type of code, reproducing the currently processed block area of image information as a result of decoding the code to obtain the index, obtaining the similar block area of image information, which has already been reproduced and stored in the reproduced-area storing portion, from the reproduced-area storing portion, using the thus-obtained index, and decoding the code so as obtain the currently processed block area of image information through predictive decoding using the thus-obtained similar block area of image information;

a second predictive decoding portion, when the identifying portion determines that the input code comprises the third type of code, reproducing the currently processed block area of image information as a result of decoding the code so as to obtain the currently processed block area of image information through predictive decoding using no block area of image information;

the reproduced-area storing portion storing the block areas of image information obtained by the identical-image decoding portion, the first predictive decoding portion and the second predictive decoding portion; and a reproduced-image integrating portion integrating these block areas of image information so as to reproduce entire image information.

Thereby, it is possible to reproduce the image from the codes, without error, which codes have been obtained as a result of highly-efficient coding performed by the above-described identical-image coding portion, first predictive coding portion and second predictive coding portion.

Other objects and further features of the present invention will become more apparent from the following detailed description when read in conjunction with the accompanying drawings.

DETAILED DESCRIPTION OF THE PREFERRED EMBODIMENTS

Figure 1:
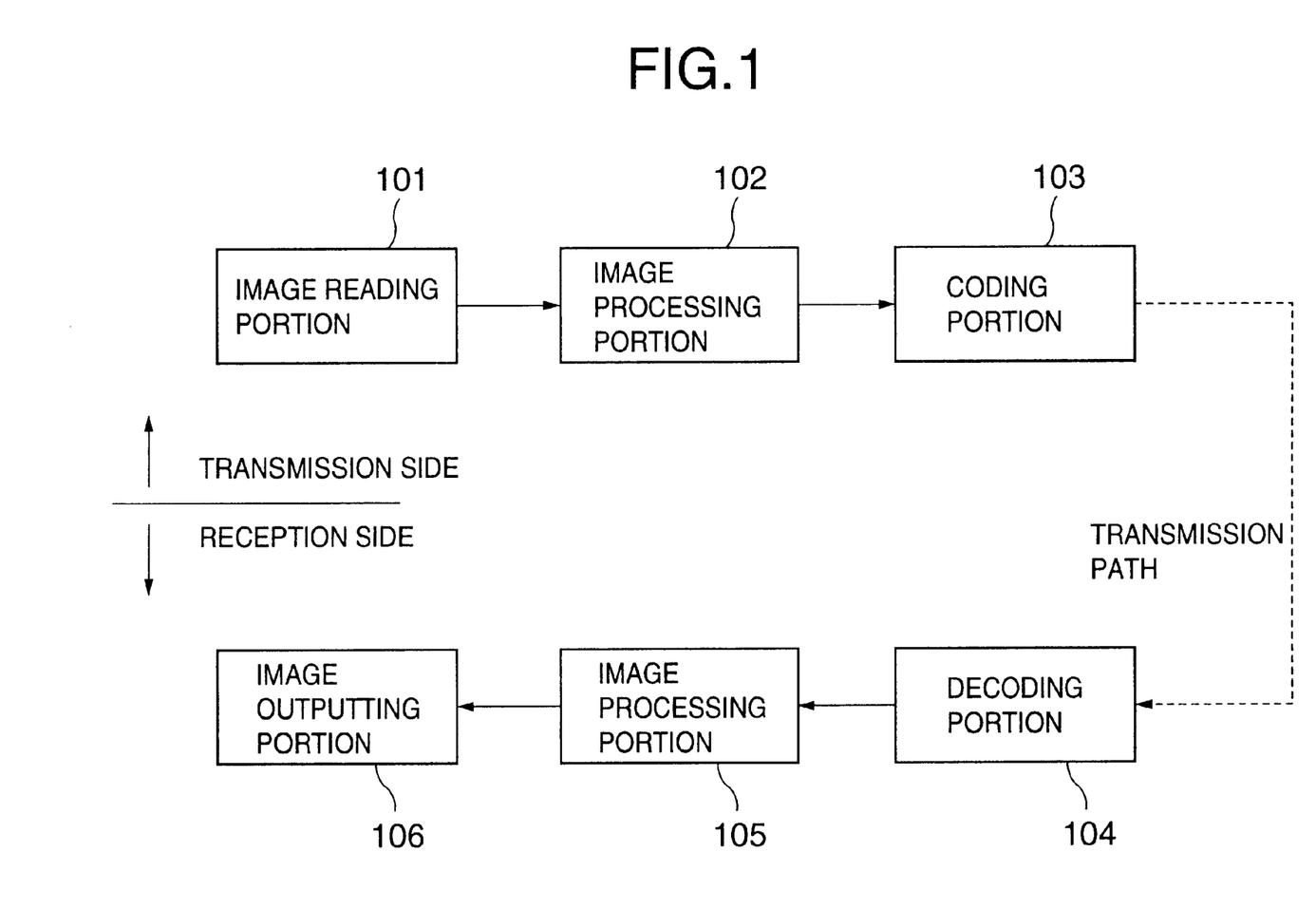
FIG. 1 shows a block diagram of a facsimile machine provided with a coding apparatus in a first embodiment of the present invention.

FIG. 1 shows a block diagram of a first embodiment of the present invention in which a coding apparatus according to the present invention is applied to a facsimile machine.

As shown in FIG. 1, in this facsimile, on a transmission side, an image reading portion 101 reads an original image through a CCD image sensor or the like. Then, a subsequent image processing portion 102 processes the read data appropriately so as to provide data suitable for being coded through a subsequent coding portion 103. Then, the coding portion 103 performs coding, and, thus-generated coded data is sent to a transmission path.

When the image is reproduced on a reception side, a decoding portion 104 decodes the coded data sent through the transmission path, an image processing portion 105 processes the decoded data so as to provide data suitable for being output through an image outputting portion 106 such as a plotter. Then, the image outputting portion 106 outputs the processed data. Thus, a hard copy of the reproduced image is obtained.

Each of the image processing portions 102 and 105 performs, for example, resolution conversion, size conversion and so forth for the bi-level images, and color (color-component) conversion, resolution conversion, size conversion and so forth for the multilevel images including color images. As examples of a coding method used by the coding portion 103 and the decoding portion 104, there are the MH, MR, MMR methods or the JBIG method using the arithmetic coding for the bi-level images, and the JPEG method using the adaptive discrete cosine transform for the multilevel images. These methods are used in facsimile machines in the related art.

Figure 2:
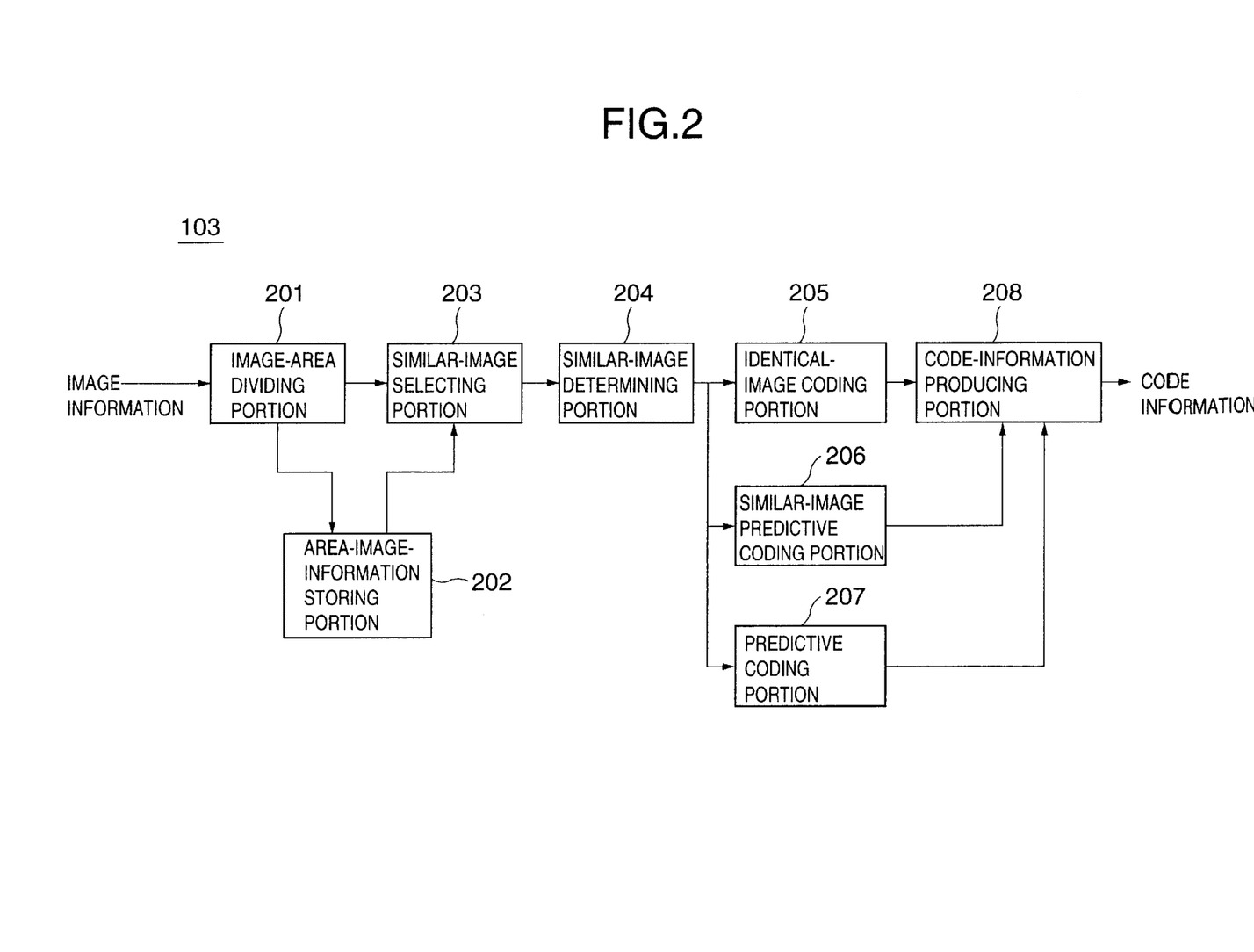
FIG. 2 shows a block diagram of a coding portion shown in FIG. 1.

The coding portion 103 shown in FIG. 1 will now be described in detail with reference to FIG. 2. FIG. 2 shows a block diagram of the coding portion 103, shown in FIG. 1, in the first embodiment of the present invention.

The coding portion 103 includes an image-area dividing portion 201, which divides image information into small block areas of image information for respective letters, figures or the like; an area-image-information storing portion 202, which stores the thus-divided small block areas of image information; a similar-image selecting portion 203, which selects and extracts a small block area of image information, from the small block areas of image information previously processed (coded) and stored in the area-image-information storing portion 202, which small block area of image information is similar to a small block area of image information which is currently processed. The coding portion 103 further includes a similar-image determining portion 204, which determines whether the similar small block area of image information selected and extracted by the similar-image selecting portion 203 is identical to the currently processed small block area of image information. When it is thus determined that they are not identical to one another, the similar-image determining portion 204 determines whether or not the selected and extracted similar small block area of image information is so similar to the currently processed small block area of image information that the similar block area of image information is useful in coding of the currently processed small block area of image information. The coding portion 103 further includes an identical-image coding portion 205 which obtains codes for the currently processed small block of image information when the similar-image determining portion 204 determines that the currently processed small block area of image information is identical to the selected and extracted similar small block area of image information. The coding portion 103 further includes a similar-image predictive coding portion 206, which codes the currently processed small block area of image information when the similar-image determining portion 204 determines that the selected and extracted similar small block area of image information is so similar to the currently processed small area of image information as to be useful in coding of the currently processed small block area of image information. The coding portion 103 further includes a predictive coding portion 207, which performs predictive coding of the currently processed small block area of image information when the similar-image determining portion 204 determined that the selected and extracted similar small block area of image information is not sufficiently similar to the currently processed small area of image information such that the similar small block area of image information is not useful in coding of the currently processed small block area of image information.

The identical-image coding portion 205 obtains codes for the currently processed small block area of image information, as a result of coding an index indicating the selected and extracted similar small block area image information which has been determined by the similar-image determining portion 204 to be identical to the currently processed small block area of image information. The similar-image predictive coding portion 206 codes the currently processed small block area of image information as a result of performing prediction from the similar small block area of image information which has been determined by the similar-image determining portion 204 to be so similar to the currently processed small block area of image information as to be useful in coding of the currently processed small block area of image information. The predictive coding portion 207 performs the predictive coding of the currently processed small block area of image information not using the selected and extracted similar small block area of image information.

The coding portion 103 further includes a code-information producing portion 208 which produces code information, to be transmitted to another facsimile apparatus, based on the results of the coding performed by the identical-image coding portion 205, similar-image predictive coding portion 206 and predictive coding portion 207.

Operation of the coding portion 103 shown in FIG. 2 will now be described. The image information is input to the image-area dividing portion 201, and is divided into the small block areas of image information, each small block area of image information corresponding to a letter, a figure or the like. The thus-divided image information is input to the area-image-information storing portion 202, and the small block areas of image information are stored in the area-image-information storing portion 202. Then, the similar-image selecting portion 203 selects and extracts the small block area of image information, from the small block areas of image information already coded and stored in the area-image-information storing portion 202, which small block area of image information is similar to the currently processed small block area of image information, based on the image information stored in the area-image-information storing portion 202.

When the similar small block area of image information is selected and extracted by the similar-image selecting portion 203, the similar-image determining portion 204 determines whether or not the thus selected and extracted similar small block area of image information is identical to the currently processed small block area of image information. Then, when it is thus determined that they are not identical to one another, the similar-image determining portion 204 determines whether or not the selected and extracted similar small block area of image information is useful in coding of the currently processed small block area of image information. When it is determined that the selected and extracted similar small block area of image information is identical to the currently processed small block area of image information, the identical-image coding portion 205 obtains codes for the currently processed small block area of image information as a result of coding the index indicating this similar small block area of image information.

When it is determined that the selected and extracted similar small block area of image information is useful in coding of the currently processed small block area of image information, the similar-image predictive coding portion 206 performs prediction using this similar small block area of image information and codes the currently processed small block area of image information. When it is determined that the selected and extracted similar small block area of image information is not useful in coding the currently processed small block area of image information, the predictive coding portion 207 performs prediction in an ordinary manner not using this similar small block area of image information and codes the currently processed small block area of image information. Thus, basic operation of the coding portion 103 shown in FIG. 2 has been described.

With regard to the information storing operation of the area-image-information storing portion 202, instead of storing the small block areas of image information itself, obtained through the dividing operation by the image-area dividing portion 201, the area-image-information storing portion 202 may merely store information of the positions and sizes of the respective small block areas. (The positions of the respective small block areas are positions of these small block areas, respectively, in the image read through the image reading portion 101 shown in FIG. 1.) Thereby, it is possible to reduce the amount of information to be stored in the area-image-information storing portion 202 in comparison to the case where the small block areas of image information are stored there. The image information, from which all of the small block areas of image information are obtained, is stored in a certain memory, not shown in the figures. Therefore, from the information of the positions and sizes of the respective small block areas, stored in the area-image-information storing portion 202, the respective small block areas of image information can be referred to from the image information stored in the certain memory. Further, it is also possible that an index is added to each set of the information of the position and size of the small block area stored in the area-image-information storing portion 202, and the stored information is managed by using the indexes. Thereby, it is possible to refer to each small block area of image information merely by specifying a respective index. Thus, the coding operation can be performed very efficiently.

Various methods can be considered as a method for the determination performed by the similar-image determining portion 204. For example, each pixel of the similar small block area of image information is compared with the corresponding pixel of the currently processed small block area of image information. Then, it is determined what number of pixels are different between the pixels of the similar small block area of image information and the pixels of the currently processed small block area of image information. The thus-determined number of pixels will be referred to as the number of different pixels. The method of using the number of different pixels can be performed by a very simple arrangement and it is possible to perform the method at high speed. Specifically, for example, when the number of the different pixels is zero, that is, when all the pixels of the similar small block area of image information are identical to all the pixels of the currently processed small block area of image information, respectively, it is determined that the similar small block area of image information is identical to the currently processed small block area of image information. When the number of different pixels is smaller than a predetermined number or the ratio of the number of different pixels to the number of all the pixels of the similar small block area of image information, for example, is smaller than a predetermined ratio, the similar small block area of image information is determined to be useful. When the number of different pixels is equal to or larger than the predetermined number or the ratio of the number of different pixels to the number of all the pixels of the similar small block area of image information, for example, is equal to or larger than the predetermined ratio, the similar small block area of image information is determined not to be useful.

The identical-image coding portion 205 codes the index, stored in the area-image-information storing portion 202, which indicates the similar small block area of image information which is determined to be identical to the currently processed small block area of image information, and information of the position of the currently processed small block area. (The position of the currently processed small block area of image information is a position of this small block area in the original image read through the image reading portion 101 shown in FIG. 1.) Thus, a series of codes are produced.

The similar-image predictive coding portion 206 codes the index, stored in the area-image-information storing portion 202, which index indicates the similar small block area of image information which is determined to be useful in coding of the currently processed small block area of image information, and the information of the position of the currently processed small block area, and codes the currently processed small block area of image information, using the similar small block area of image information. Thus, a series of codes are produced.

The predictive coding portion 207 codes information of the size of the currently processed small block area and the information of the position of the currently processed small block area, and codes the currently processed small block area of image information. Thus, a series of codes are produced.

Further, in order to identify which one of the coding portions 205, 206 and 207 was used for coding the currently processed small block area of image information, it is preferable to add identification information to the top of each series of codes. This identification information is added to the top of each series of codes by a respective one of the coding portions 205, 206 and 207. Further, the coding-information producing portion 208 adds identification information which indicates the end of the codes. The identification information should indicate one of the three coding portions 205, 206 and 207, and the end of the code information which includes the series of codes obtained through the respective coding portions 205, 206 and 207. For this purpose, two bits are needed as the identification information. By coding the identification information, it is possible to reduce the amount of information.

With regard to the above-mentioned information of the position of each small block area, instead of using the position of the small block area measured from a base point (for example, the top left of the original image), it is possible to use the differential between the position of the previously processed small block area and the position of the currently processed small block area. Thereby, it is possible to reduce the absolute value of the amount of information needed to specify the position, and to reduce the amount of information to be coded.

Figure 6:
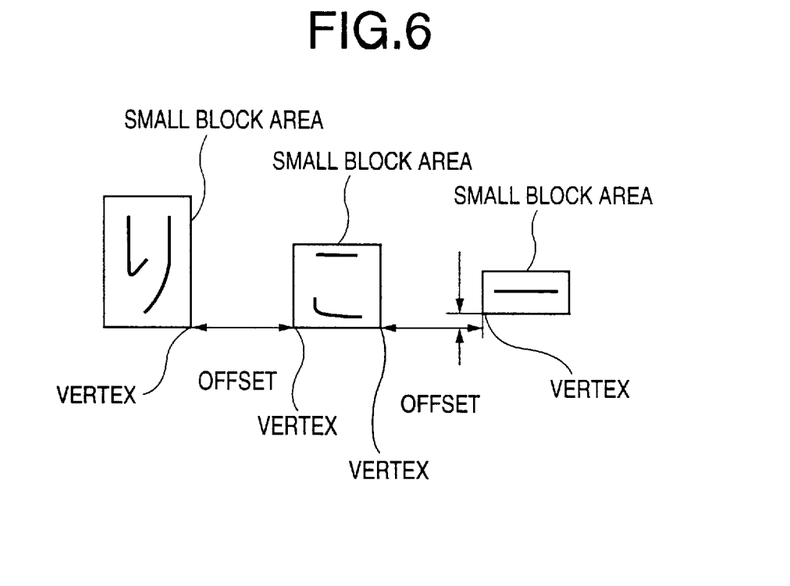
FIG. 6 shows a concept of information of a position of each small block area to be coded.

In order to further reduce the amount of information to be coded, it is possible to use the difference between the position of a vertex of the previously processed small block area and the position of a vertex of the currently processed small block area, where the vertexes of these small block areas are selected so that the distance between the thus-selected vertexes of these small block areas is shortest. Thereby, it is possible to further reduce the amount of information to be coded. This case will be described with reference to FIG. 6. FIG. 6 shows a concept of a case where the amount of the position information is efficiently reduced.

In FIG. 6, each image information is indicated by OFFSET. As shown in FIG. 6, each OFFSET is a distance between the vertexes of the adjacent small block areas, where the vertexes are selected so that the distance between thus-selected vertexes of the adjacent small block areas is shortest.

Figure 5:
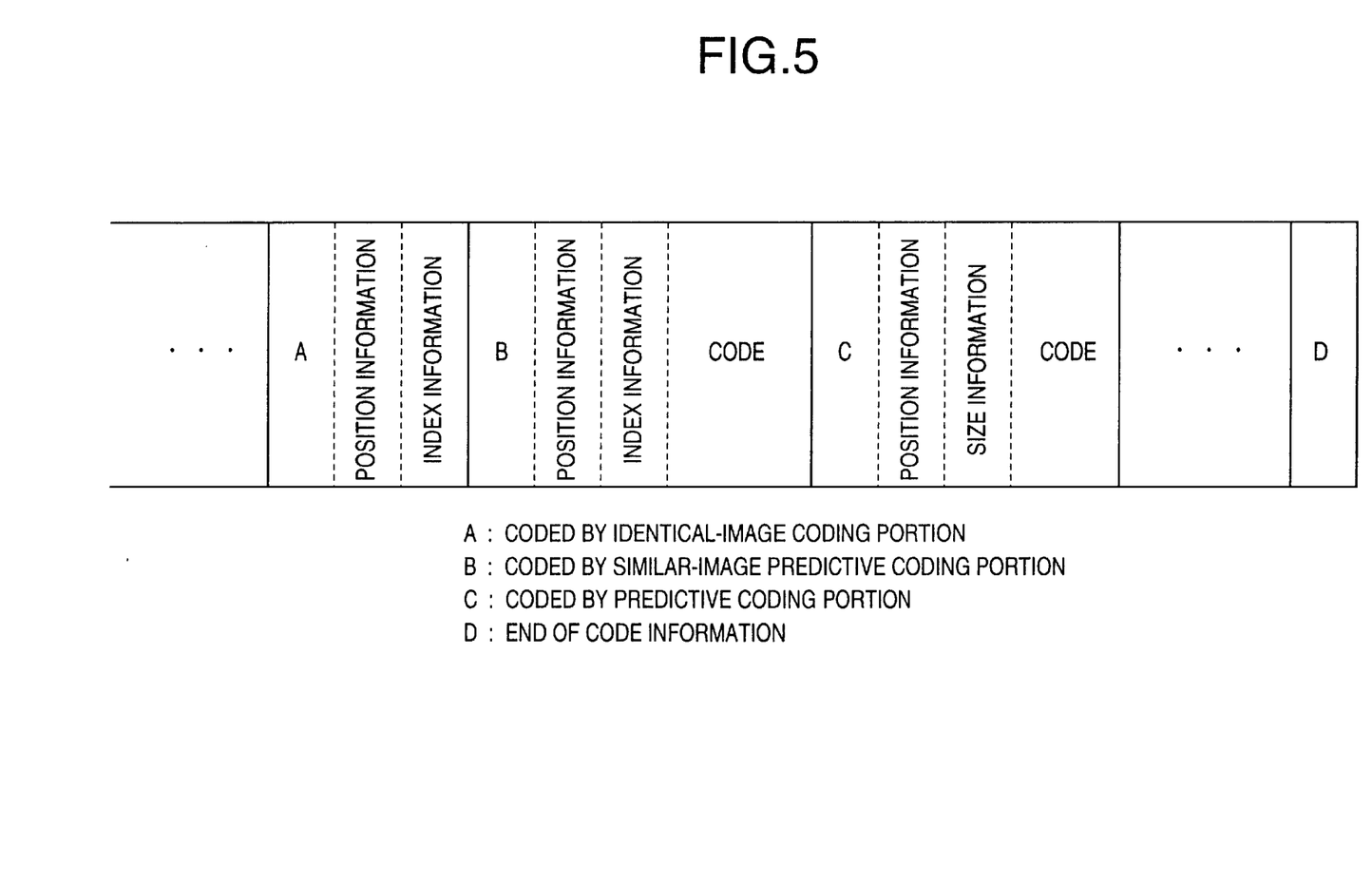
FIG. 5 shows a concept of codes transmitted from the coding portion shown in FIG. 2.

With reference to FIG. 5, a concept of a case where information obtained through coding by the identical-image coding portion 205, similar-image predictive coding portion 206 and predictive coding portion 207 is used for producing the code information which is transmitted from the code-information producing portion 208, will now be described. FIG. 5 shows the concept of the codes obtained through the coding by these three coding portions 205, 206 and 207. As described above, the identical-image coding portion 205 codes the index (index information) indicating the similar small block area of image information, and information (position information) of the position of the currently processed small block area. The similar-image predictive coding portion 206 codes the index (index information) indicating the similar small block area of image information, and the information (position information) of the position of the currently processed small block area, and codes the currently processed small block area of image information (code information), using the similar small block area of image information. The predictive coding portion 207 codes information of the size (size information) of the currently processed small block area and the information (position information) of the position of the currently processed small block area, and codes the currently processed small block area of image information (code information). Further, in order to identify which one of the coding portions 205, 206 and 207 was used for coding, and to indicate the end of the code information, the identification information (A, B or C) is added to the top of each series of codes and the identification information D is added to the end of the code information. The identification information indicates the three coding portions 205(A), 206(B) and 207(C), and the end of the code information (D).

Operation of the similar-image selecting portion 203 shown in FIG. 2 will now be described. As a method for selecting the already coded small block area of image information similar to the currently processed small block area of image information, a method of searching for the small block area, the size of which is the same as the size of the currently processed small block area, is considered. By using this method, it is possible to reduce the time required for the search and to improve the data coding speed.

Figure 7:
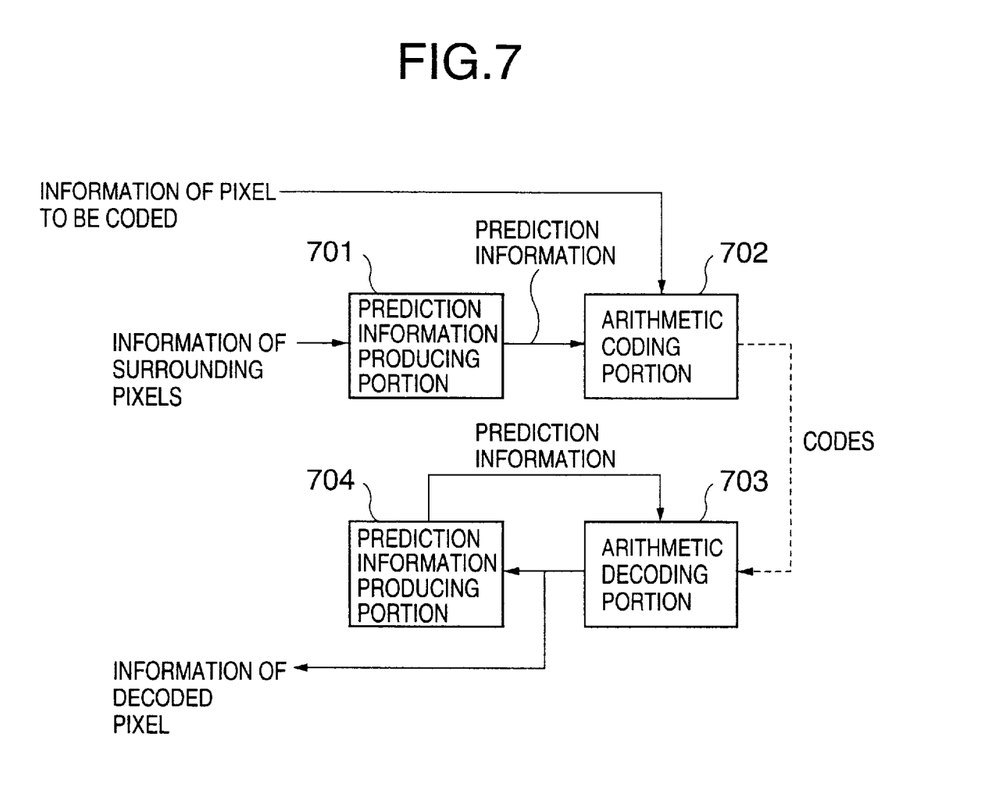
FIG. 7 shows a block diagram of an operation portion which performs arithmetic coding which is performed by the coding portion and arithmetic decoding which is performed by the decoding portion.
Figure 8:
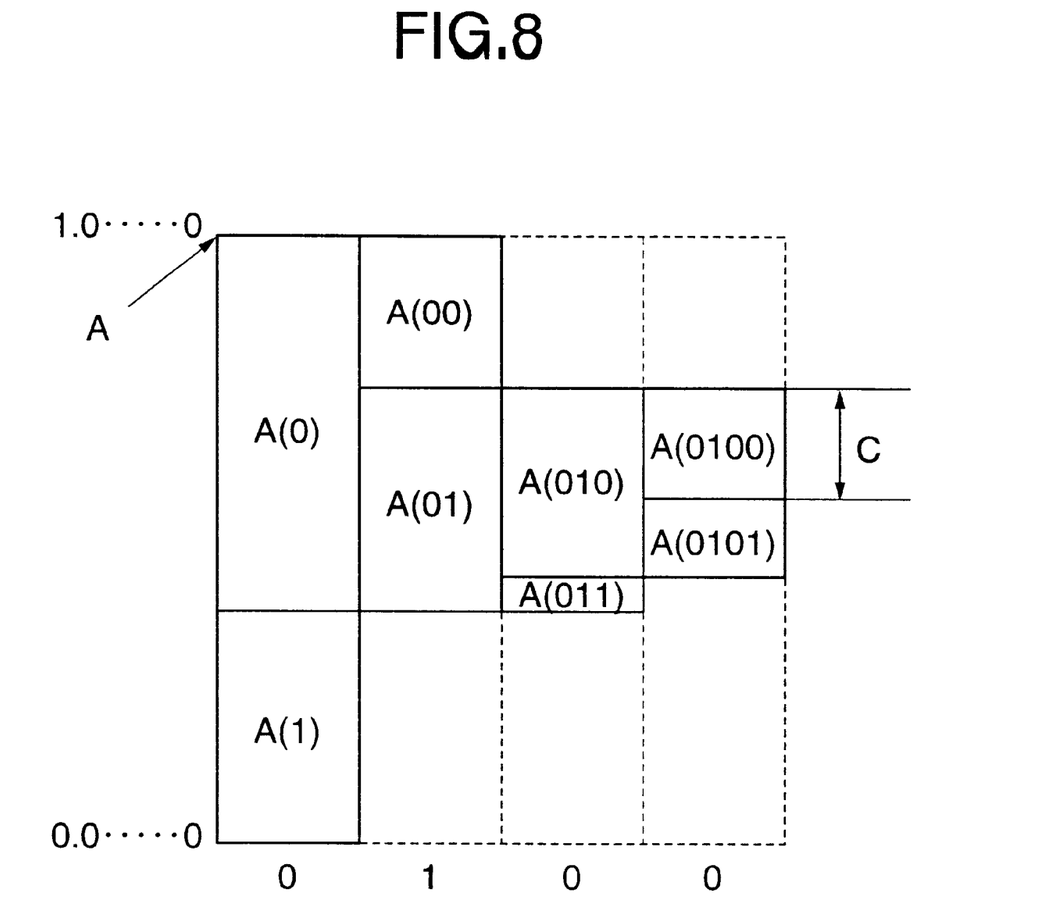
FIG. 8 shows a concept of the arithmetic coding performed by the operation portion shown in FIG. 7.

An example of a coding method used by each of the similar-image predictive coding portion 206 and the predictive coding portion 207 will be described with reference to FIGS. 7 and 8. FIG. 7 shows a block diagram of an operation portion which performs arithmetic coding and arithmetic decoding. FIG. 8 shows a concept of the arithmetic coding.

With reference to FIG. 7, a prediction information producing portion (which may be referred to as a template) 701 produces predicted data for a pixel to be coded using a state of Markov source obtained from the situation of surrounding pixels. Then, using the predicted data, an arithmetic coding portion 702 codes the pixels with dynamic evaluation of the predicted data.

When the coded data is decoded, a prediction information producing portion 704, the same as the prediction information producing portion 701, produces predicted data for the pixel to be decoded using the state of Markov source obtained from the situation of the surrounding pixels which have been already decoded. Then, using the predicted data, an arithmetic decoding portion 703 decodes the pixels with dynamic evaluation of the predicted data.

Generally speaking, the efficiency of the arithmetic coding method is higher than that of the run-length coding method (MH, MR). In the arithmetic coding method, a section (from 0.00 . . . 0 through 0.11 . . . 1, in binary decimal) of the number line between 0 and 1 is divided into divisions having different lengths in accordance with appearance probabilities of respective symbols, while subject symbol series are allocated to the corresponding divisions, respectively. Thus, dividing is repeated, and a division is finally obtained. The coordinate of a point included in this division is expressed by a binary decimal which can distinguish this division from the other divisions, and the thus-obtained binary decimal is used as a code.

With reference to FIG. 8, the concept of the arithmetic coding will now be described by using an example of a symbol series '0100'. When the first symbol is coded, the entire section is divided into A(0) and A(1) in accordance with the ratio of the appearance probabilities of the symbols '0' and '1'. Then, actually, '0' appears. Thereby, A(0) is selected. Then, when the second symbol is coded, A(0) is further divided in accordance with the ratio of the appearance probabilities of the two symbols in the state. Then, A(01) is selected as a division corresponding to the appearing symbol series.

Through such repetition of division and selection, coding progresses. When decoding, a process completely reverse to the process of coding is performed. Based on the binary decimal indicated by the code, the symbol series is reproduced. An important point is that the length of the number line when coding of the symbol series is started should be the same as the number line when decoding of the symbol series is started. Otherwise, the symbol series cannot be accurately reproduced. Ordinarily, the length of the number line is 1 in each of the coding side and decoding side.

Figure 4:
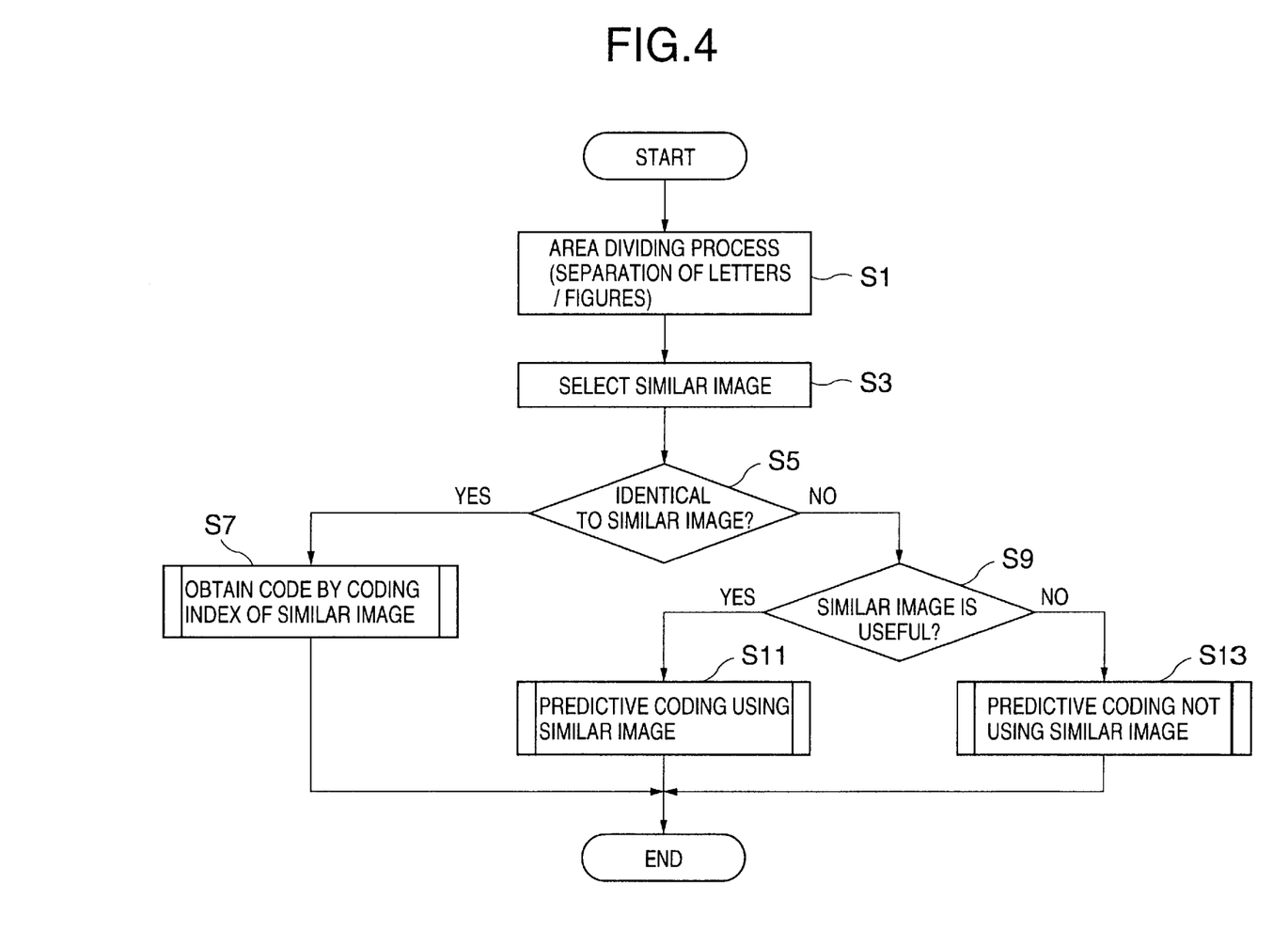
FIG. 4 shows a flowchart of an operation of the coding portion shown in FIG. 2.

According to the present invention, input image information is coded in the above-described process. A coding operation of the coding apparatus in the first embodiment of the present invention will now be described with reference to FIG. 4. FIG. 4 shows a flowchart of the coding operation of the coding apparatus in the first embodiment of the present invention.

As shown in FIG. 4, the image-area dividing portion 201 divides input image information into small block areas of image information (in a step S1). Then, in a step S3, the similar-image selecting portion 203 selects the small block area of image information (which was already coded) similar to the small block area of image information (which is currently being coded). The thus-selected small block area of image information (which was already coded) similar to the small block area of image information (which is currently being coded) is referred to as the similar small block area of image information. The small block area of image information, which is currently being coded, is referred to as the currently processed small block area of image information.

Then, the similar-image determining portion 204 determines whether or not the similar small block area of image information is identical to the currently processed small block area of image information (in a step S5). Then, when the similar-image determining portion 204 determines that the similar small block area of image information is identical to the currently processed small block area of image information (YES in the step S5), the identical-image coding portion 205 obtains codes for the currently processed small block area of image information as a result of coding the index indicating the similar small block area of image information, in a step S7. Then, the operation finishes.

When the similar-image determining portion 204 determines that the similar small block area of image information is not identical to the currently processed small block area of image information (NO in the step S5), the similar-image determining portion 204 determines whether or not the similar small block area of image information is useful in coding of the currently processed small block area of image information, in a step S9.

Then, when the similar-image determining portion 204 determines that the similar small block area of image information is useful in coding of the currently processed small block area of image information (YES in the step S9), the similar-image predictive coding portion 206 codes the currently processing small block area of image information using the similar small block area of image information, in a step Sll. Then, the operation finishes.

Specifically, when coding the currently processed small block area of image information, the similar-image predictive coding portion 206 uses surrounding pixels of a certain pixel of the similar small block area of image information, the certain pixel corresponding to the currently coded pixel of the currently processed small block area of image information, for predicting the currently coded pixel. The above-mentioned surrounding pixels of the certain pixel of the similar small block area of image information can include not only preceding pixels of the certain pixel but also following pixels of the certain pixel. This is because the similar small block area of image information has been already coded, and thus, the preceding pixels and the following pixels in the similar small block area of image information have already been coded. Thereby, in comparison to a case where only preceding pixels are used as the surrounding pixels for predicting the currently coded pixel, a probability that the prediction comes true is high as a result of preceding pixels and following pixels being used as the surrounding pixels. As a result, coding can be performed efficiently.

When the similar-image determining portion 204 determines that the similar small block area of image information is not useful in coding of the currently processed small block area of image information (NO in the step S9), the predictive coding portion 207 codes the currently processed small block area of image information not using the similar small block area of image information, in a step S13. Then, the operation finishes.

Specifically, when coding the currently processed small block area of image information, the predictive coding portion 207 uses surrounding pixels of the currently coded pixel of the currently processed small block area of image information for predicting the currently coded pixel. The above-mentioned surrounding pixels of the currently coded pixel of the currently processed small block area of image information can include only preceding pixels of the currently coded pixel. This is because only the preceding pixels have already been coded in the currently processed small block area of image information.

Figure 3:
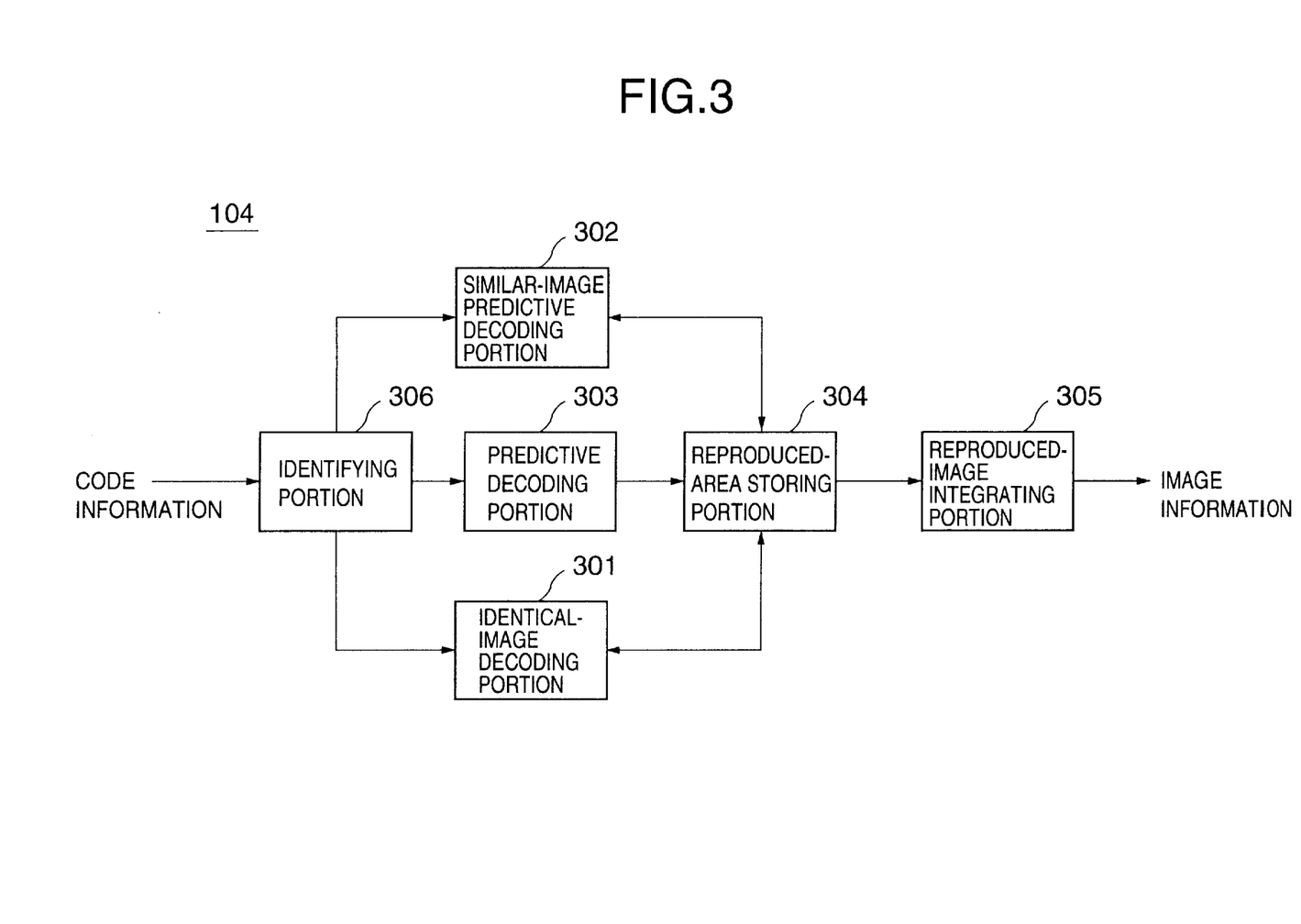
FIG. 3 shows a block diagram of a decoding portion shown in FIG. 1.

With reference to FIG. 3, the decoding portion 104 shown in FIG. 1 will now be described in detail. FIG. 3 shows a block diagram of the decoding portion 104 shown in FIG. 1.

As shown in FIG. 3, the decoding portion 104 includes an identifying portion 306, an identical-image decoding portion 301, a similar-image predictive decoding portion 302, a predictive decoding portion 303, a reproduced-area storing portion 304, and a reproduced image integrating portion 305.

The identifying portion 306 determines whether the input code includes a code obtained as a result of the index indicating the similar small block area of image information (determined to be identical to the currently processed small block area of image information) being coded; a code obtained as a result of the index indicating the similar small block area of image information being coded and a code obtained as a result of the currently processed small block area of image information being coded by using the similar small block area of image information; or a code obtained as a result of the currently processed small area of image information being coded by using no other small block area of image information.

The identical-image decoding portion 301 decodes the code which was obtained as a result of the index being coded, which index indicates the similar small block area of image information which was determined to be identical to the currently processed small block area of image information. The identical-image decoding portion 301 obtains the currently processed small block area of image information as a result of obtaining the similar small block area of image information, which has been already reproduced and stored in the reproduced-area storing portion 304, from the reproduced-area storing portion 304, using the thus-decoded index.

The similar-image predictive decoding portion 302 reproduces the currently processed small block area of image information as a result of decoding the index indicating the similar small block area of image information, obtaining the similar small block area of image information, which has been already reproduced and stored in the reproduced-area storing portion 304, from the reproduced-area storing portion 304, using the thus-decoded index, and decoding the code of the currently processed small block area of image information through prediction and decoding using the thus-obtained similar small block area of image information.

The predictive decoding portion 303 reproduces the currently processed small block area of image information as a result of decoding the code of the currently processed small block area of image information through prediction and decoding using no small block area of image information which has been already reproduced.

The reproduced-area storing portion 304 stores the small block areas of image information obtained by the three decoding portions 301, 302 and 303. The reproduced-image integrating portion 305 integrates these small block areas of image information so as to reproduce the entire image information.

Operation of the decoding portion 104 shown in FIG. 3 will now be described. First, it is determined by the identifying portion 306 whether the input code includes a code obtained as a result of the index indicating the similar small block area of image information (determined to be identical to the currently processed small block area of image information) being coded; a code obtained as a result of the index indicating the similar small block area of image information being coded and a code obtained as a result of the currently processed small area of image information being coded by using the similar small block area of image information; or a code obtained as a result of the currently processed small area of image information being coded by using no other small block area of image information.

When it is determined that the input code includes the code obtained as a result of the index indicating the similar small block area of image information (determined to be identical to the currently processed small block area of image information) being coded, the index is obtained through decoding, and the similar small block area of image information which has been already reproduced and stored in the reproduced-area storing portion 304 is obtained by using the decoded index, through the identical-image decoding portion 301, from the reproduced-area storing portion 304. Thus, the currently processed small block area of image information is obtained, and is output to the reproduced-area storing portion 304.

When it is determined that the input information includes the code obtained as a result of the index indicating the similar small block area of image information being coded and the code obtained as a result of the currently processed small area of image information being coded by using the similar small block area of image information, the coded index is decoded, the similar small block area of image information which has been already reproduced and stored in the reproduced-area storing portion 304 is obtained by using the thus-decoded index from the reproduced-area storing portion 304, and the currently processed small block of image information is reproduced from the code through prediction and decoding by using the thus-obtained similar small block area of image information, through the similar-image predictive decoding portion 302. The thus-reproduced currently processed small block area of image information is output to the reproduced-area storing portion 304.

When it is determined that the input code includes the code obtained as a result of the currently processed small area of image information being coded by using no other small block area of image information, the currently processed small block area of image information is reproduced through prediction and decoding by using no already reproduced small block area of image information, through the predictive decoding portion 303. The thus-reproduced currently processed small block area of image information is output to the reproduced-area storing portion 304.

The reproduced-area storing portion 304 stores the reproduced small block areas of image information, and outputs the stored reproduced small block areas of image information to the reproduced-image integrating portion 305 so that the entire image information is produced. The reproduced-image integrating portion 305 finally integrates the respective reproduced small block areas of image information, produces the entire image information and outputs the entire image information.

In order to prove the advantage of the coding apparatus in the first embodiment of the present invention, an experimental comparison was performed. In this experimental comparison, the coding in the coding apparatus in the first embodiment of the present invention and the coding according to JBIG-1 are performed and the results thereof are compared. In this experimental comparison, the test chart No.4 of ITU-T is used as a sample image. The resolution of the sample image is 400 dpi.

The results of the experimental comparison are as follows:

the amount of resulting codes in the case of JBIG-1: 99802 bytes; and the amount of resulting codes in the case of the first embodiment of the present invention: 79707 bytes.

Thus, the coding efficiency is improved by 25% when the coding in the first embodiment of the present invention is performed in comparison to the case where the coding according to JBIG-1 is performed.

Thus, in the coding apparatus in the first embodiment, when the small block area of image information obtained as a result of input image information being divided is coded, a correspondence relationship with each of the previously coded small block areas of image information is examined. Then, when there is the already coded small block area of image information which is identical to the currently processed small block area of image information, the identical-image coding portion 205 obtains the code for the currently processed small block area of image information as described above. When there is no already coded small block area of image information which is identical to the currently processed small block area of image information, but there is the already coded small block area of image information which is useful in coding of the currently processed small block area of image information, the similar-image predictive coding portion 206 codes the currently processed small block area of image information as described above. When there is no already coded small block area of image information which is identical to the currently processed small block area of image information, and also there is no already coded small block area of image information which is useful in coding of the currently processed small block area of image information, the predictive coding portion 207 codes the currently processed small block area of image information as described above. Thus, it is possible to very efficiently code an image including letters and so forth.

Figure 9:
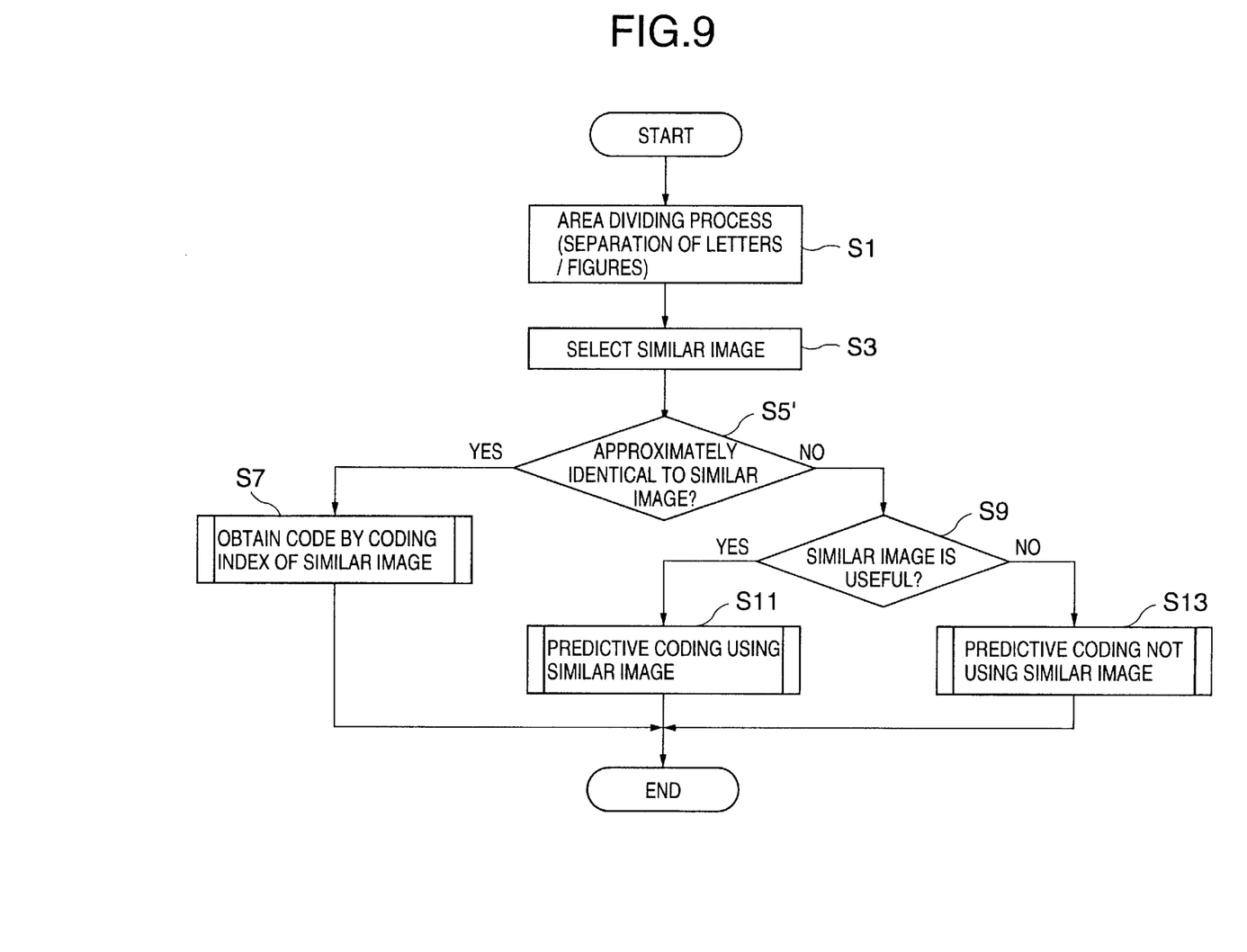
FIG. 9 shows a flowchart of operation of a coding portion of a coding apparatus in a variant embodiment of the first embodiment of the present invention.

FIG. 9 shows a flowchart of an operation of a coding portion of a coding apparatus in a variant embodiment of the first embodiment of the present invention. In the operation of the cording portion of the coding apparatus in the variant embodiment, in comparison to the operation of the coding portion of the coding apparatus shown in FIG. 4, the step S5 is replaced by a step S5'.

'Similarity' will now be defined. Similarity Sm is obtained from the following equation:

$$Sm = Ni/Nt$$

where Nt represents the total number of the pixels of the currently processed small block area of image information. Ni represents the number of the pixels of the currently processed small block area of image information, which pixels are identical to the corresponding pixels of the similar small block area of image information, respectively.

In the step S5', it is determined through a similar-image determining portion (similar to the similar-image determining portion 204 shown in FIG. 2) whether or not $Sm \geq Th0$, where Th0 represents a threshold value for the identical-image coding. In this embodiment, Th0=0.90. When it is determined in the step S5' that $Sm \geq Th0$, it is determined that the similar small block area of image information, selected and extracted in the step S3 through the similar-image selecting portion 203, is approximately identical to the currently processed small block area of image information (YES in the step S5'). Then, in the step S7, the identical-image coding portion 205 obtains a code of the currently processed small block area of image information as a result of coding the index indicating the similar small block area of image information. Then, the operation finishes. Thus, because the similar small block area of image information, which is determined to be approximately identical to the currently processed small block area of image information, is used as the currently processed small block area of image information, this coding is lossy coding. In contrast to this, in the first embodiment described with reference to FIG. 4, because the similar small block area of image information, which is determined to be (absolutely) identical to the currently processed small block area of image information, is used as the currently processed small block area of image information, this coding is lossless coding.

When it is determined in the step S5' that Sm<Th0, it is determined that the similar small block area of image information, selected and extracted in the step S3 through the similar-image selecting portion 203, is not approximately identical to the currently processed small block area of image information (NO in the step S5'). The similar-image determining portion determines whether or not the similar small block area of image information is useful in coding of the currently processed small block area of image information, in a step S9. Specifically, in the step S9, the similar-image determining portion determines whether or not $Th0 > Sm \geq Th$, where Th represents a threshold value for the similarity. For this embodiment, Th=0.85. When it is determined that $Th0 > Sm \geq Th$, it is determined that the similar small block area of image information, selected and extracted in the step S3 through the similar-image selecting portion 203, is useful in coding of the currently processed small block area of image information (YES in the step S9). Then, the similar-image predictive coding portion 206 codes the currently processed small block area of image information using the similar small block area of image information, in a step S11. Then, the operation finishes.

Specifically, when coding the currently processed small block area of image information, the similar-image predictive coding portion 206 uses surrounding pixels of a certain pixel of the similar small block area of image information, the certain pixel corresponding to the currently coded pixel of the currently processed small block area of image information, for predicting the currently coded pixel. The above-mentioned surrounding pixels of the certain pixel of the similar small block area of image information can include not only preceding pixels of the certain pixel but also following pixels of the certain pixel. This is because the similar small block area of image information has already been coded, and thus, the preceding pixels and the following pixels in the similar small block area of image information have already been coded. Thereby, in comparison to a case where only preceding pixels are used as the surrounding pixels for predicting the currently coded pixel, a probability that the prediction comes true is high as a result of preceding pixels and following pixels being used as the surrounding pixels. As a result, coding can be performed efficiently.

When the similar-image determining portion 204 determines that Sm<Th, that is, the similar small block area of image information is not useful in coding of the currently processed small block area of image information (NO in the step S9), the predictive coding portion 207 codes the currently processing small block area of image information not using the similar small block area of image information, in a step S13. Then, the operation finishes.

Specifically, when coding the currently processed small block area of image information, the predictive coding portion 207 uses surrounding pixels of the currently coded pixel of the currently processed small block area of image information for predicting the currently coded pixel. The above-mentioned surrounding pixels of the currently coded pixel of the currently processed small block area of image information can include only preceding pixels of the currently coded pixel. This is because only the preceding pixels have already been coded in the currently processed small block area of image information.

In order to prove the advantage of the coding apparatus in the variant embodiment of the first embodiment of the present invention, an experimental comparison was performed. In this experimental comparison, the coding in the coding apparatus in the variant embodiment of the first embodiment of the present invention and the coding according to JBIG-1 are performed and the results thereof are compared. Also in this experimental comparison, the test chart No. 4 of ITU-T is used as a sample image. The resolution of the sample image is 400 dpi.

The results of the experimental comparison are as follows:

the amount of resulting codes in the case of JBIG-1: 99802 bytes; and the amount of resulting codes in the case of the variant embodiment of the first embodiment of the present invention: 48749 bytes.

Thus, the coding efficiency is improved by 105% when the coding in the variant embodiment of the first embodiment of the present invention is performed in comparison to the case where the coding according to JBIG-1 is performed.

Thus, in the coding apparatus in the variant embodiment of the first embodiment, when the small block area of image information obtained as a result of input image information being divided is coded, a correspondence relationship with each of the previously coded small block areas of image information is examined. Then, when there is the already coded small block area of image information which is approximately identical to the currently processed small block area of image information, the identical-image coding portion 205 obtains the code for the currently processed small block area of image information as described above. When there is no already coded small block area of image information which is approximately identical to the currently processed small block area of image information, but there is the already coded small block area of image information which is useful in coding of the currently processed small block area of image information, the similar-image predictive coding portion 206 codes the currently processed small block area of image information as described above. When there is no already coded small block area of image information which is approximately identical to the currently processed small block area of image information, and also there is no already coded small block area of image information which is useful in coding of the currently processed small block area of image information, the predictive coding portion 207 codes the currently processed small block area of image information as described above. Thus, it is possible to very efficiently code an image including letters and so forth.

The present invention is advantageous in particular for processing image information of bilevel images. However, not only for processing image information of bi-level monochrome images, the present invention is also advantageous for processing image information of bitoneral color images.

Further, the present invention is not limited to the above-described embodiments, and variations and modifications may be made without departing from the scope of the present invention.

The contents of the basic Japanese Patent Application No. 9-297754, filed on Oct. 15, 1997, are hereby incorporated by reference.

What is claimed is:

1. A coding apparatus comprising:

an image-area dividing portion configured to divide input image information into block areas of image information for respective letters and/or figures;

an area-image-information storing portion configured to store the block areas of image information provided by said image-area dividing portion;

a similar-image selecting portion configured to compare a currently processed block area of image information with an index of already coded block areas stored in said area-image-information storing portion, and to select and extract an already coded block area that is alike to the currently processed block area of image information;

a similar-image determining portion configured to determine whether the alike block area is identical to said currently processed block area of image information, to determine whether said alike block area is so similar to said currently processed block area of image information that said alike block area is useful in coding said currently processed block area of image information, and to determine whether said alike block area is so un-similar to said currently processed block area that the alike block area is not useful in coding said currently processed block area of image information;

an identical-image coding portion configured to obtain a code for the currently processed block area of image information by obtaining the code of the alike block area when said similar-image determining portion determines that the alike block area is identical to said currently processed block area;

a first predictive coding portion configured to obtain a code for the currently processed block area of image information by performing predictive coding of the currently processed block area using the alike block area when said similar-image determining portion determines that the alike block area is so similar to the currently processed block area that the alike block area is useful in coding the currently processed block area;

a second predictive coding portion configured to obtain a code for the currently processed block area of image information by performing predictive coding of the currently processed block area without using the alike block area when said similar-image determining portion determines that the alike block area of image information is so unsimilar to the currently processed block area that the alike block area is not useful in coding the currently processed block area; and a code-information producing portion configured to produce code information based on the codes obtained by said identical-image coding portion, said first predictive coding portion and said second predictive coding portion.

2. The coding apparatus as claimed in claim 1, wherein said area-image-information storing portion stores information of a size and a position of the block area for each block area of image information, instead of storing the block area of image information itself.

3. The coding apparatus as claimed in claim 1, wherein:

said identical-image coding portion is further configured to obtain information of a position of the currently processed block area, said first predictive coding portion is further configured to obtain the information of the position of the currently processed block area, and said second predictive coding portion is further configured to obtain information of the position of the currently processed block area.

4. The coding apparatus as claimed in claim 3, wherein the information of the position of the currently processed block area is obtained as information of a difference between a position of a previously processed block area and the position of the currently processed block area.

5. The coding apparatus as claimed in claim 4, wherein the information of the difference between the position of the previously processed block area and the position of the currently processed block area is the distance between ends of the previously processed block area and the currently processed block area, the ends of the previously processed block area and the currently processed block area being selected such that the distance between the ends of the previously processed block area and the currently processed block area is shortest.

6. The coding apparatus as claimed in claim 1, wherein:

each of said identical-image coding portion, said first predictive coding portion and said second predictive coding portion is further configured to add first identification information to the code of the currently processed block area of image information, the first identification information indicating which one of said identical-image coding portion, said first predictive coding portion and said second predictive coding portion has been used for coding the currently processed block area of image information; and said code-information producing portion adds second identification information to the end of the code information, the second identification information indicating the end of the code information.

7. The coding apparatus as claimed in claim 1, wherein said similar-image selecting portion selects and extracts the alike block area of image information having a size essentially the same as a size of the currently processed block area of image information.

8. The coding apparatus as claimed in claim 1, wherein said similar-image determining portion determines whether the alike block area of image information is identical to the currently processed block area of image information, is so similar to the currently processed block area of image information as to be useful, or is so un-similar to the currently processed block area as to be un-useful, by determining how many pixels are different between the pixels of the currently processed block area of image information and the pixels of the alike block area of image information.

9. A decoding apparatus comprising:

an identifying portion configured to determine whether an input code comprises a first type of code, a second type of code or a third type of code, the first type of code comprising a code obtained as a result of an already coded alike block area determined to be identical to a currently processed block area of image information being coded, the second type of code comprising a code obtained as a result of an already coded alike block area determined to be useful in coding the currently processed block area of image information being coded, and the third type of code comprising a code obtained as a result of the currently processed block area of image information being coded by using no other block area of image information;

an identical-image decoding portion, configured to identify when said identifying portion determines that the input code comprises the first type of code, decode the first type of code so as to obtain the currently processed block area of image information by obtaining the alike block area of image information from a reproduced-area storing portion;

a first predictive decoding portion, configured to decode when said identifying portion determines that the input code comprises the second type of code, decode the second type of code to obtain the alike block area of image information from said reproduced-area storing portion, and to obtain the currently processed block area of image information through predictive decoding using the obtained alike block area of image information;

a second predictive decoding portion, configured to predict when said identifying portion determines that the input-code comprises the third type of code, decode the third type of code so as to obtain the currently processed block area of image information through predictive decoding using no other block area of image information;

said reproduced-area storing portion being configured to store the block areas of image information obtained by said identical-image decoding portion, said first predictive decoding portion and said second predictive decoding portion; and a reproduced-image integrating portion being configured to integrate these block areas of image information so as to reproduce entire image information.

* * * * *